US012703444B2

(12) United States Patent
Hedlund et al.

(10) Patent No.: US 12,703,444 B2
(45) Date of Patent: Aug. 11, 2026

(54) SNOWMOBILE

(71) Applicant: Polaris Industries Inc., Medina, MN (US)

(72) Inventors: Michael A. Hedlund, Roseau, MN (US); Lyle J. Dahlgren, Roseau, MN (US); Jesse J. Laugen, Roseau, MN (US); Keith W. Peppel, Roseau, MN (US); Blair M. Johnson, Roseau, MN (US); Cody S. Kofstad, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 80 days.

(21) Appl. No.: 18/607,691

(22) Filed: Mar. 18, 2024

(65) Prior Publication Data

US 2024/0343325 A1 Oct. 17, 2024

Related U.S. Application Data

(63) Continuation of application No. 16/244,048, filed on Jan. 9, 2019, now abandoned.

(Continued)

(51) Int. Cl.

*B62D 55/10* (2006.01)
*B29C 48/00* (2019.01)

(Continued)

(52) U.S. Cl.

CPC .......... *B62D 55/10* (2013.01); *B29C 48/0022* (2019.02); *B62D 55/07* (2013.01);

(Continued)

(58) Field of Classification Search

CPC .... B62D 55/10; B62D 55/07; B62D 55/0847; B62D 55/253; B29C 48/0022;

(Continued)

(56) References Cited

U.S. PATENT DOCUMENTS 728,922 A 5/1903 Howard
2,016,187 A 10/1935 Vincent (Continued)

FOREIGN PATENT DOCUMENTS

CA 2744680 A1 12/2011
CA 2928750 A1 6/2015

(Continued)

OTHER PUBLICATIONS

CA-2996648-A1 English Translation (Year: 2017).*

(Continued)

*Primary Examiner* — Michael T. Walsh
(74) *Attorney, Agent, or Firm* — Merchant & Gould P.C.

(57) ABSTRACT

A snowmobile comprises a chassis with a front portion and a tunnel, and a power train unit supported by the chassis. The snowmobile further includes a plurality of ground-engaging members cooperating with the power train unit to operate the snowmobile. The plurality of ground-engaging members includes a pair of front skis and an endless track assembly. The snowmobile also includes a front suspension operably coupled to the pair of front skis. The snowmobile also includes a rear suspension operably coupled to the track. The rear suspension includes slide rails and track sliders for engaging the track. The track sliders are comprised of a first and second retention members for coupling with the slide rail. The retention members are comprised of a plurality of recesses where material is removed for light weighting.

3 Claims, 20 Drawing Sheets

Related U.S. Application Data

(60) Provisional application No. 62/615,786, filed on Jan. 10, 2018.

(51) Int. Cl.

| | |
|---|---|
| ***B62D 55/07*** | (2006.01) |
| ***B62D 55/084*** | (2006.01) |
| ***B62M 27/02*** | (2006.01) |
| *B29L 31/30* | (2006.01) |
| *B62D 55/253* | (2006.01) |

(52) U.S. Cl.
CPC ......... *B62D 55/0847* (2013.01); *B62M 27/02* (2013.01); *B29L 2031/30* (2013.01); *B62D 55/253* (2013.01); *B62M 2027/026* (2013.01); *B62M 2027/027* (2013.01); *B62M 2027/028* (2013.01)

(58) Field of Classification Search
CPC ........ B29C 48/12; B29C 48/13; B62M 27/02; B62M 2027/026; B62M 2027/027; B62M 2027/028; B29L 2031/30
See application file for complete search history.

(56) References Cited

U.S. PATENT DOCUMENTS

| | | | | |
|---|---|---|---|---|
| 3,427,637 | A | 2/1969 | Quinlan et al. | |
| 3,770,330 | A | 11/1973 | Bombardier | |
| 3,881,213 | A | 5/1975 | Tilli | |
| 3,887,242 | A | 6/1975 | Russ, Sr. | |
| 4,108,453 | A | 8/1978 | Lavalier | |
| 4,595,211 | A | 6/1986 | Fitzpatrick | |
| 5,829,545 | A | 11/1998 | Yamamoto et al. | |
| 6,155,656 | A | 12/2000 | Gulla | |
| 7,226,136 | B2 | 6/2007 | Blanchard | |
| 8,240,782 | B2 * | 8/2012 | Bessette | B62D 55/125 305/131 |
| 8,348,000 | B2 | 1/2013 | Watling | |
| 9,427,653 | B1 | 8/2016 | Chen | |
| 9,656,724 | B2 | 5/2017 | Bedard et al. | |
| 10,328,981 | B2 * | 6/2019 | Sibilleau | B62D 55/10 |
| 2009/0008990 | A1 * | 1/2009 | Sibilleau | B62D 55/104 180/193 |
| 2012/0160150 | A1 | 6/2012 | Handfield | |
| 2014/0182960 | A1 | 7/2014 | Bedard et al. | |
| 2018/0170463 | A1 | 6/2018 | Dumitru et al. | |
| 2018/0244326 | A1 | 8/2018 | Zuchoski | |
| 2019/0210669 | A1 | 7/2019 | Dahlgren et al. | |

FOREIGN PATENT DOCUMENTS

| | | | | | |
|---|---|---|---|---|---|
| CA | 2744680 | C | * | 10/2016 | B62M 27/02 |
| CA | 2996648 | A1 | * | 3/2017 | B62D 55/04 |
| CN | 117552273 | A | * | 2/2024 | E01B 23/00 |
| FR | 2929767 | A1 | * | 10/2009 | H02G 3/0443 |

OTHER PUBLICATIONS

CA-2744680-C English Translation (Year: 2016).*
FR-2929767-A1 English Translation (Year: 2009).*
CN-117552273-A English Translation (Year: 2024).*
Office Action issued by the Canadian Intellectual Property Office, dated Oct. 20, 2020, for Canadian Patent Application No. 3,029,617; 7 pages.

* cited by examiner 562
572
574
564
578
566
576
580

590
572
574
564
588
566
580

704
748
706
726
714
700
712
702

728
738
706
700
714
712
730

L
1020
1040
1016
1032
1002
1004
1018

SNOWMOBILE

CROSS-REFERENCE TO RELATED APPLICATIONS

The present application is a continuation of U.S. patent application Ser. No. 16/244,048, filed Jan. 9, 2019, which claims priority to U.S. provisional patent application Ser. No. 62/615,786 filed Jan. 10, 2018, the entire disclosures of which are incorporated herein by reference.

BACKGROUND OF THE DISCLOSURE

The present invention relates to a slider for a tracked vehicle and, more particularly, to a slider optimized to reduce weight of a snowmobile or other tracked vehicle.

Generally, snowmobiles are available for various applications such as deep snow, high performance, luxury touring, and trail riding, for example. Regardless of the application, certain structural components are common to many snowmobiles. For example, snowmobiles typically include a frame, a track assembly, a power train, skis, and at least one suspension system, as are illustrated in U.S. Pat. No. 8,490,731, issued on Jul. 23, 2013, U.S. Pat. No. 9,446,810, issued on Sep. 20, 2016, U.S. Pat. No. 7,353,898, issued on Apr. 8, 2008, and U.S. Provisional Application Ser. No. 61/513,949, filed on Aug. 1, 2011, the complete disclosures of which are expressly incorporated by reference herein.

One common area for snowmobiles generally relates to the overall architecture, where a frame includes a tunnel and a front chassis portion which retains the power train, and a front suspension that mounts skis to the frame. A drive shaft is typically mounted to the front chassis portion and includes drive sprockets for powering the track. A chain case is also typically provided to transfer power from an engine or CVT to the drive shaft. Reference is made to U.S. Pat. No. 7,694,768 which shows a typical snowmobile drivetrain with a drive shaft and an upper jack shaft that drives the drive sprockets through the chain case, the subject matter of which is expressly incorporated herein by reference.

In the case of mountain or deep snow snowmobiles, one common characteristic is to provide an elongated track to provide a longer footprint for the track, and a lower pressure for the snowmobile for flotation in deep snow. An elongated tunnel is also provided to cover the extended track. A front body typically surrounds at least the front frame portion to enclose the engine and other mechanical components. Reference is made to U.S. Pat. No. 7,870,920, issued on Jan. 18, 2011 and to U.S. Pat. No. 9,446,810 both of which show deep snow snowmobiles, the subject matter of each being expressly incorporated herein by reference. A present version of a snowmobile frame for deep snow is shown in FIG. 1.

SUMMARY OF THE DISCLOSURE

According to an illustrative embodiment of the present disclosure, a track slider for engaging an endless track on a snowmobile comprises a slide surface with a slide surface width and a first retention member coupled to the slide surface. The track slider further comprises a second retention member coupled to the slide surface and the second retention member is located opposite a longitudinal centerline of the track slider from the first retention member. The track slider further comprises a third retention member coupled to the slide surface and. The first retention member is spaced apart longitudinally by at least one fourth of the slide surface width from the third retention member.

According to another illustrative embodiment of the present disclosure, a track slider for engaging an endless track on a snowmobile comprises a slide surface with a slide surface length and a slide surface width. The track slider further comprises a first retention side coupled to the slide surface with a first cumulative retention length, and a second retention side coupled to the slide surface with a second cumulative retention length. The first cumulative retention length is shorter than the slide surface by at least the slide surface width.

According to another illustrative embodiment of the present disclosure, a track slider for engaging an endless track on a snowmobile comprises a slide surface with a slide surface length and a slide surface width configured to engage a track. The track slider further comprises a longitudinal centerline of the track slider and a plurality of retention members coupled to the slide surface and configured to couple the track slider to a snowmobile rail. The slide surface length is longer than a cumulative length of the retention members by at least the slide surface width.

According to another illustrative embodiment of the present disclosure, a method of producing a track slider for a snowmobile comprises forming a slide surface and at least one retention member of the track slider. The track slider further comprises forming a recess in a portion of a retention member and maintaining a configuration of the slide surface as formed during the forming step.

According to another illustrative embodiment of the present disclosure, a track slider for engaging an endless track and a slide rail of a snowmobile comprises a first surface configured to engage the endless track with a width and a second surface configured to engage the slide rail. The track slider further comprises a plurality of retention portions with a generally vertical orientation relative to the first surface and a plurality of recessed portions positioned intermediate adjacent retention portions. The recessed portions are located on a middle portion of the track slider.

According to another illustrative embodiment of the present disclosure, a track slider for engaging an endless track and a slide rail of a snowmobile comprises a first surface configured to engage the endless track and a second surface configured to engage the slide rail and extending between a lowermost surface and an upper most surface. The track slider further comprises a plurality of recesses defined in the second surface intermediate the lowermost and uppermost surfaces of the second surface, and each of the plurality of recesses includes a length extending longitudinally, a width extending laterally, and a height extending vertically. The length is at least as great as the height and the width.

According to yet another illustrative embodiment of the present disclosure, a track slider for engaging an endless track and a slide rail of a snowmobile comprises a first surface configured to engage the endless track, a second surface configured to engage the slide rail and including a retention portion with a generally vertical orientation relative to the first surface. The track slider further comprises a third surface generally parallel to the first surface and configured to engage the slide rail. The third surface includes at least a first recessed portion positioned intermediate the third and first surface.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
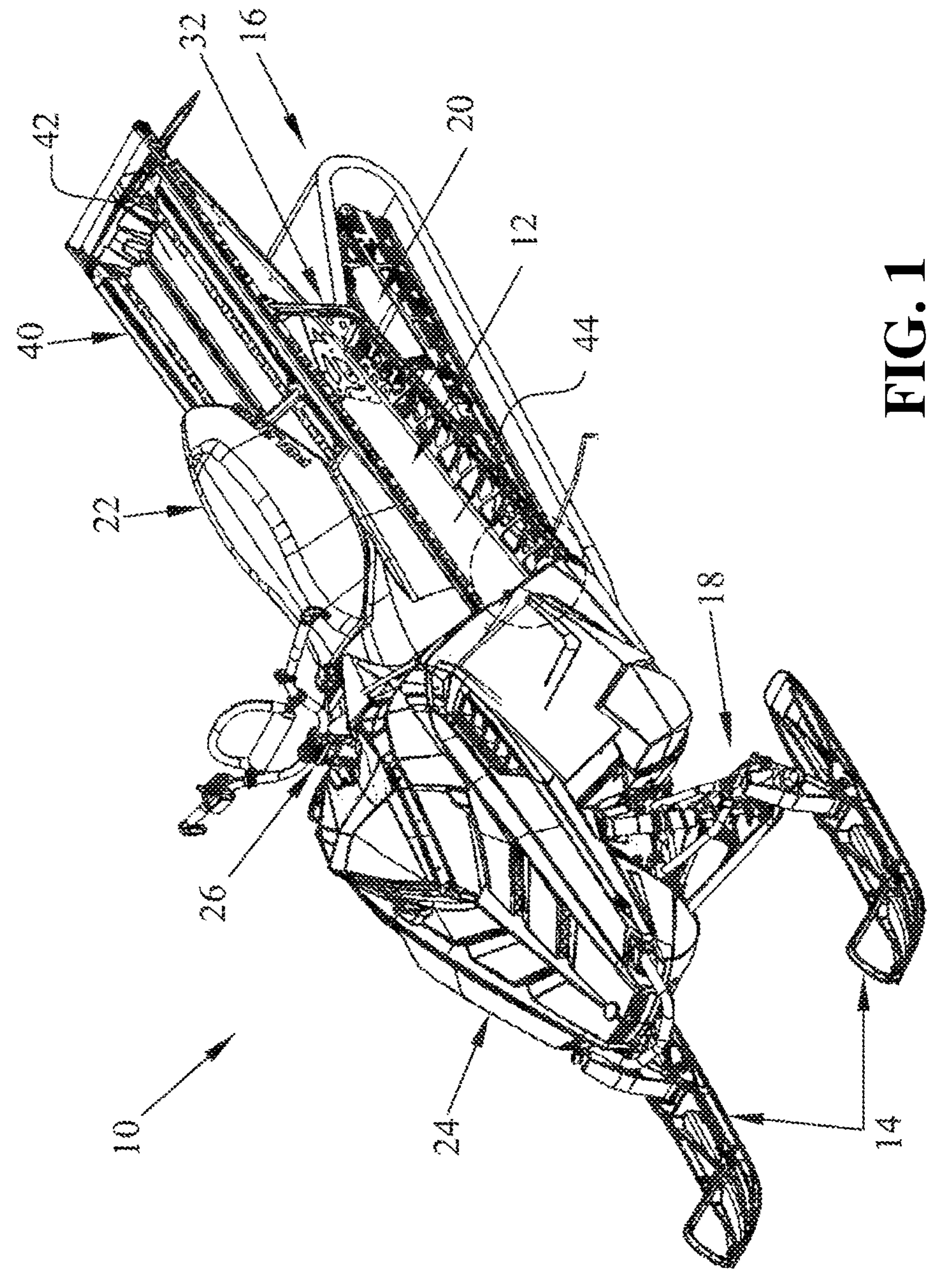
FIG. 1 is a front perspective view of an illustrative embodiment of a snowmobile.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. For example, while the following description refers primarily to a snowmobile, it should be understood that the principles of the invention apply equally to other snow vehicles or off road vehicles. While the present invention primarily involves a snowmobile, it should be understood, however, that the invention may have application to other types of vehicles, such as motorcycles, ATVs, utility vehicles, scooters, and mopeds.

Figure 2:
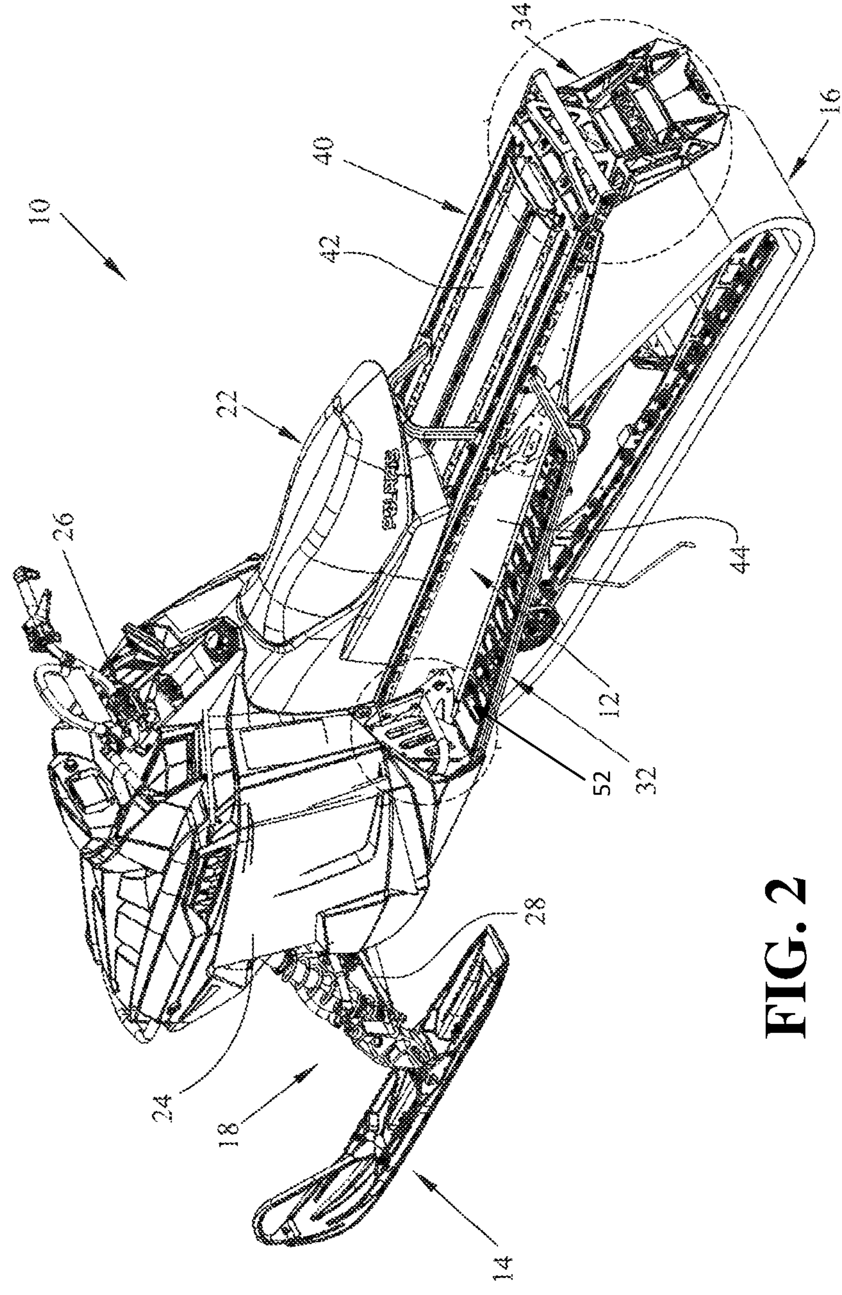
FIG. 2 is a rear perspective view of the embodiment shown in FIG. 1.
Figure 3:
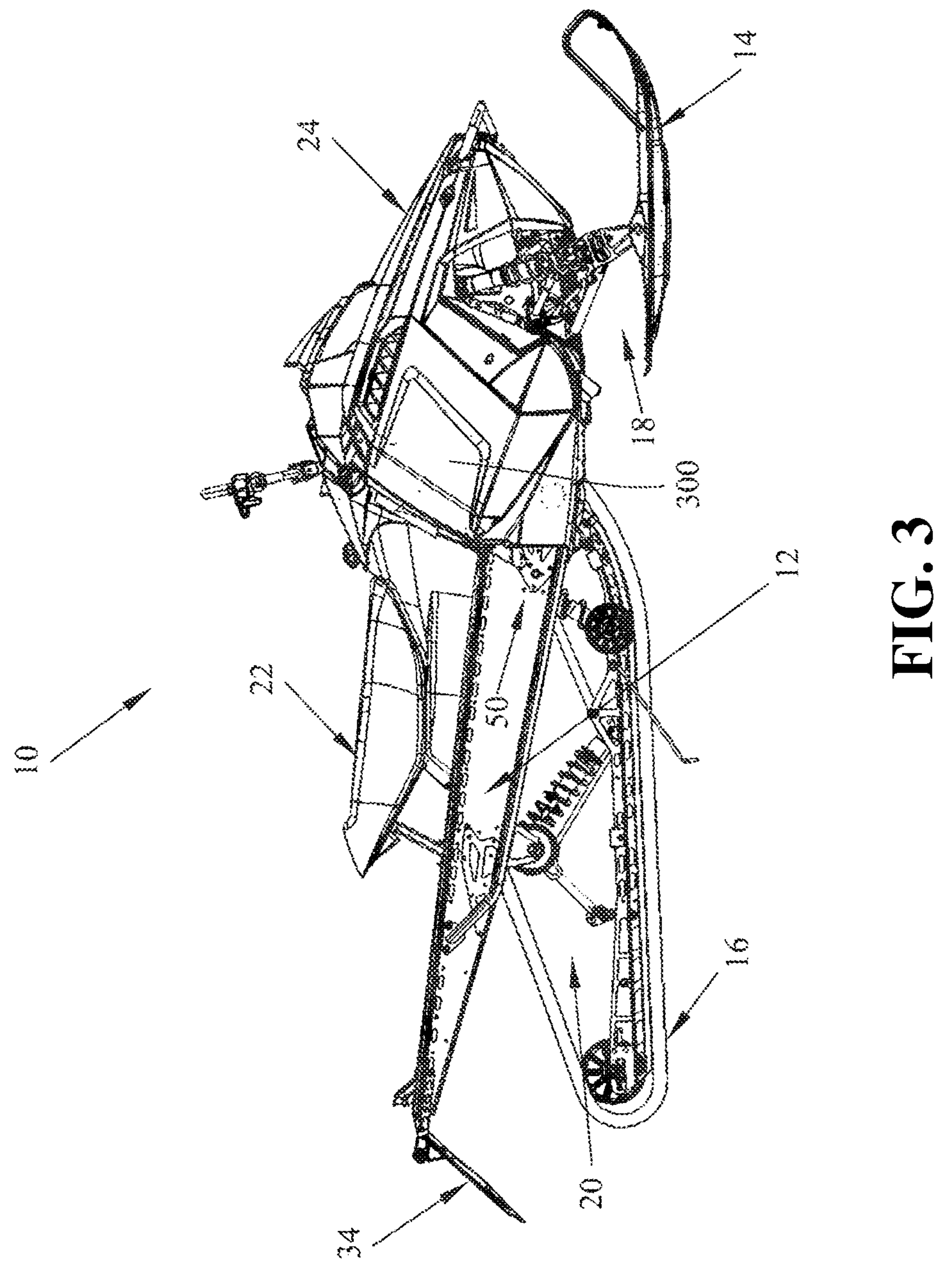
FIG. 3 is a side view of the right hand side of the embodiment shown in FIG. 1.

Referring to FIGS. 1-3, one illustrative embodiment of a snowmobile 10 is shown. Snowmobile 10 includes a frame 12, supported by front skis 14 and by track assembly 16. Front skis are coupled to a front suspension 18, and track assembly is supported by a rear suspension 20. Snowmobile 10 also includes a seat assembly 22, front outer body 24, and a steering assembly 26. Steering assembly 26 is operably coupled to steering arms 28 (FIG. 2) which allows a rider to steer snowmobile 10. A power train is covered by outer body 24 and provides power to track assembly 16. Running board assemblies 32 extend along the sides of the seat assembly which are supported by the frame 12. A snow flap 34 (FIG. 2) is also supported by the frame rearward of the track. In one embodiment, one or more of the ground-engaging members 14 may be replaced with tracks, such as the Prospector II Tracks available from Polaris Industries Inc., located at 2100 Highway 55 in Medina, MN 55340, or non-pneumatic tires, such as those shown in U.S. Pat. Nos. 8,176,957 and 8,104,524, the complete disclosures of which are expressly incorporated herein by reference.

With reference to FIGS. 1 and 2, frame 12 includes a tunnel 40 having a top wall 42 and side walls 44. As shown best in FIG. 2, track 16 at least partially runs up into tunnel 40 between side walls 44 and upwardly towards top wall 42. As shown, running board assemblies 32 include a rider's foot grip assembly 50 (FIG. 3) and a foot tread assembly 52, where the foot grip assembly 50 and foot tread assembly 52 are supported by the tunnel sidewall 44.

Figure 4:
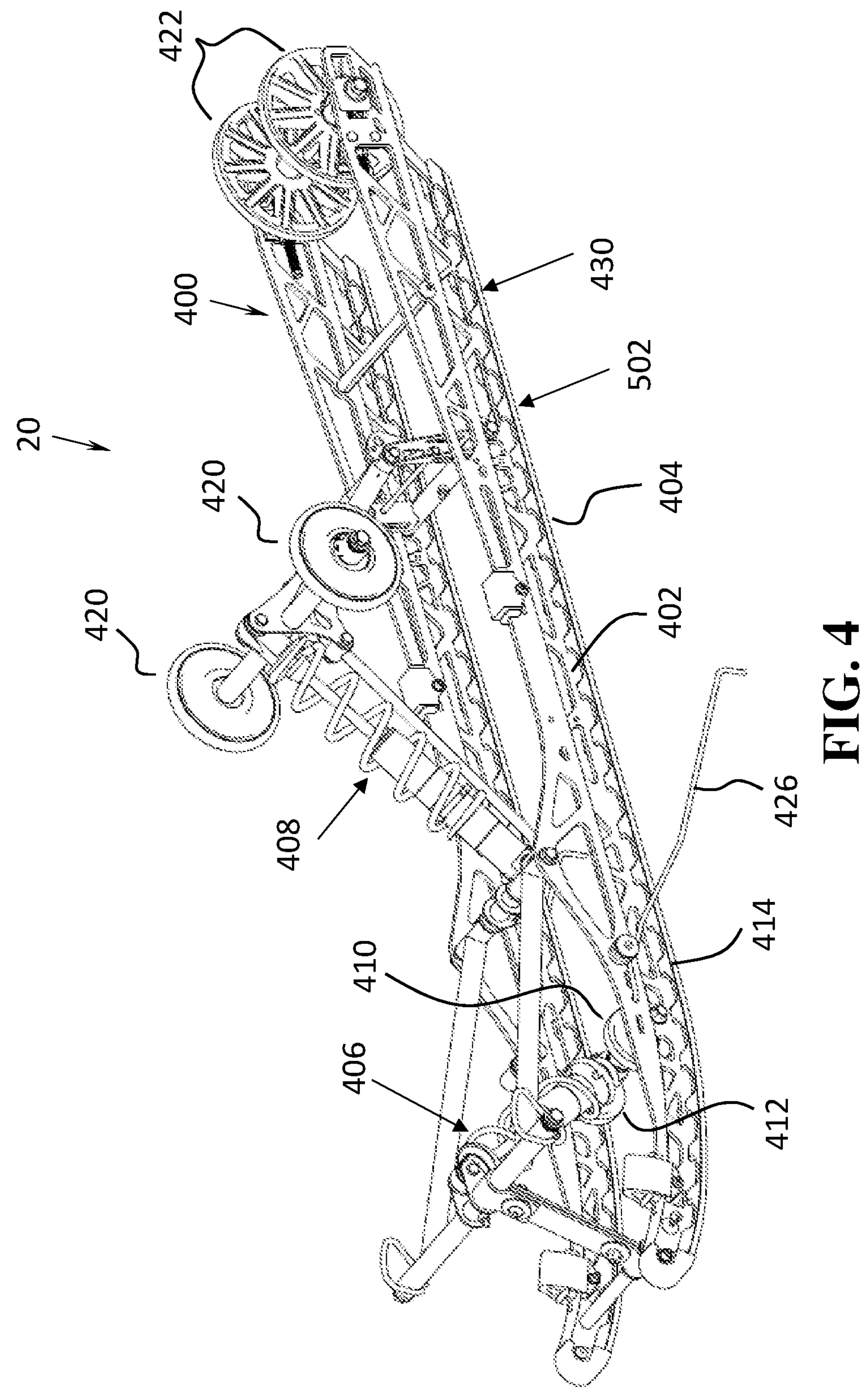
FIG. 4 is a front perspective view showing the suspension system removed from the tunnel.

With reference now to FIG. 4, rear suspension 20 is shown removed from the tunnel 40, understanding that the rear suspension 20 is attached to the underside of tunnel 40. Suspension 20 includes a frame 400 having laterally spaced frame rails 402 each with a track slider 404 attached thereto. Suspension 20 includes two coil over shocks 406 and 408 providing dampening between the tunnel 40 and frame 400. A track roller 410 is mounted on the outside of the slide rail 402, and as shown, has an outer radial surface 412 which extends beyond lower surface 414 of slider 404. Track rollers 410 are located at a position proximate a maximum pressure point between the sliders 404 and track 16 (absent the track wheel) which allows the track a slight spacing between the sliders 404 preventing substantial frictional heating. Suspension 20 also includes idler rollers 420 and 422 which may be adjusted to tighten or loosen the track 16. Scratchers 426 are also provided on the side of frame 404 to break up crusted snow in order that the track 16 can throw snow against the underside of tunnel 40 to facilitate cooling of the power train, as the tunnel includes a heat exchanger for engine water.

Figure 5:
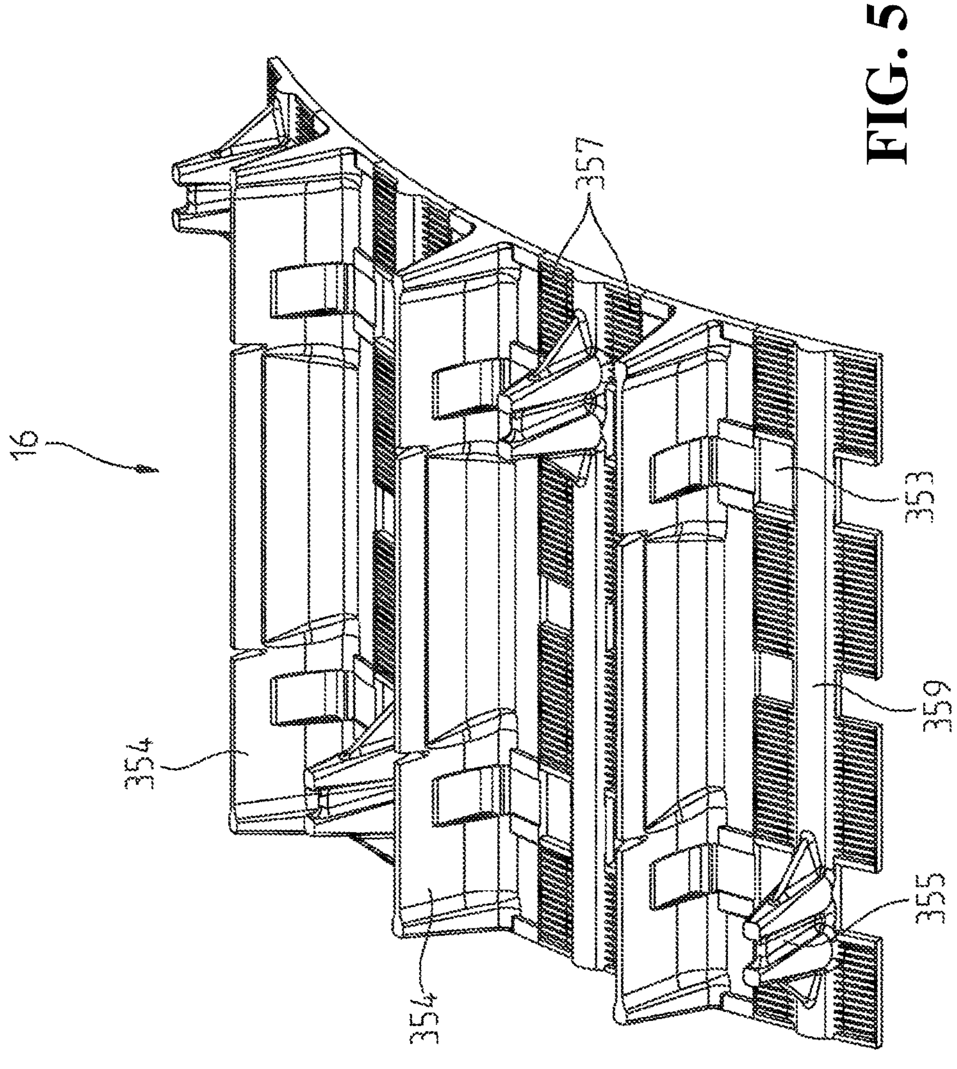
FIG. 5 is a portion of an endless track of the snowmobile of FIG. 1.

As best shown in FIG. 5, the outer surface of endless track 16 includes a plurality of couplers 354 and a plurality of intermediate extensions 355. Endless track 16 includes a plurality of tread layers 357 extending in a circumferential direction. Each intermediate extension 355 is supported by a tread member 359 that is perpendicular to tread layers 357. Couplers 354 and intermediate extensions 355 project outwardly from tread layers 357 and tread members 359, respectively, to contact the ground. As shown in FIG. 5, tread layers 357 intersect tread members 359 to define a plurality of apertures 353. Apertures 353 provide a window for snow to enter and provide lubrication and cooling between the track 16 and track slider 404. Slider 404 is made from an extrusion process and commonly made from a synthetic resin, in this embodiment it is made from Polyethylene, more specifically Ultra High Molecular Weight (UHMW) Polyethylene, other common materials for slider 404 include synthetic plastics such as polytetrafluoroethylene (PTFE), nylon, and polyurethane.

Figure 6:
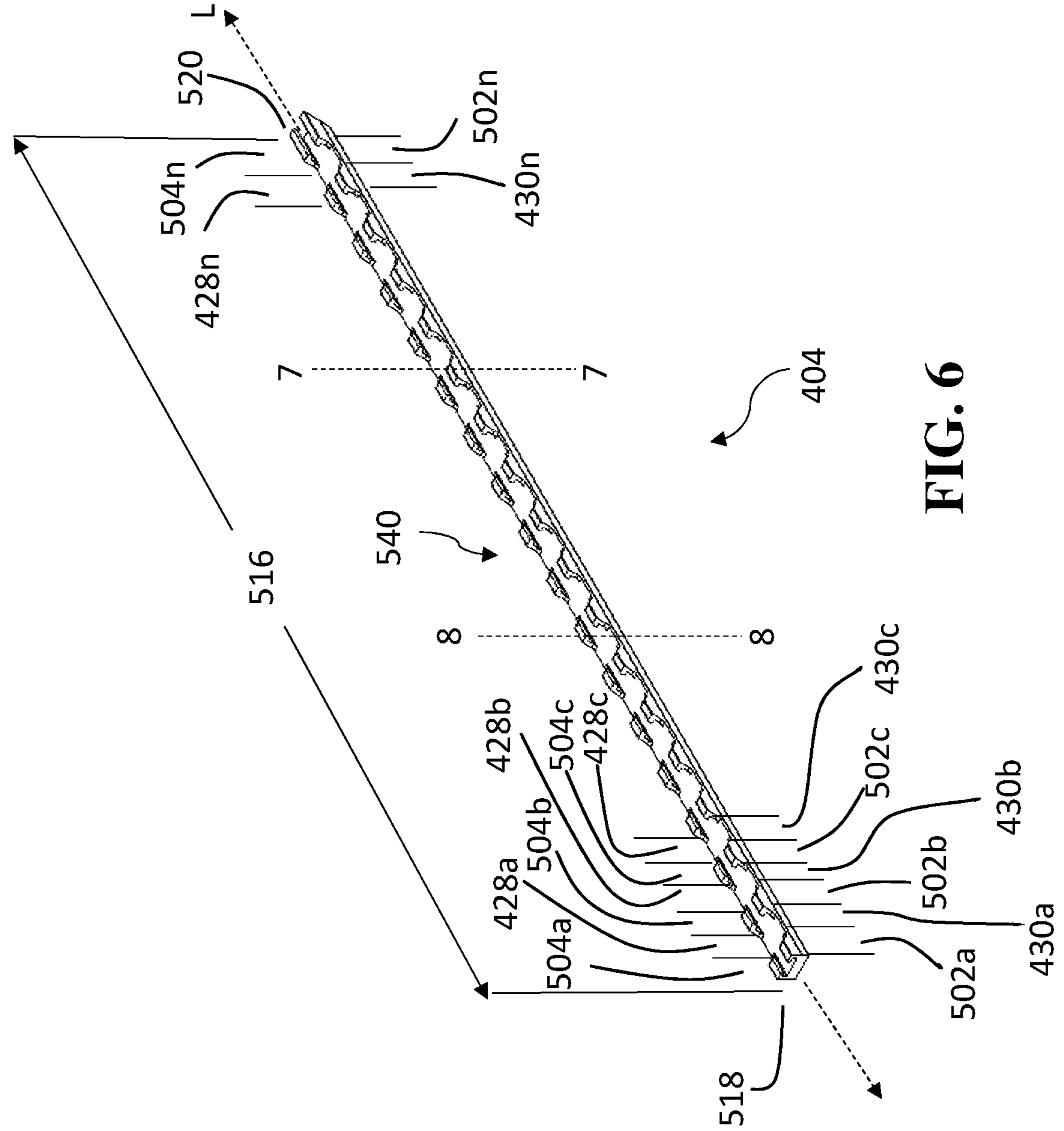
FIG. 6 is a front perspective view of one embodiment of a track slider of the snowmobile of FIG. 1.
Figures 7, 8:
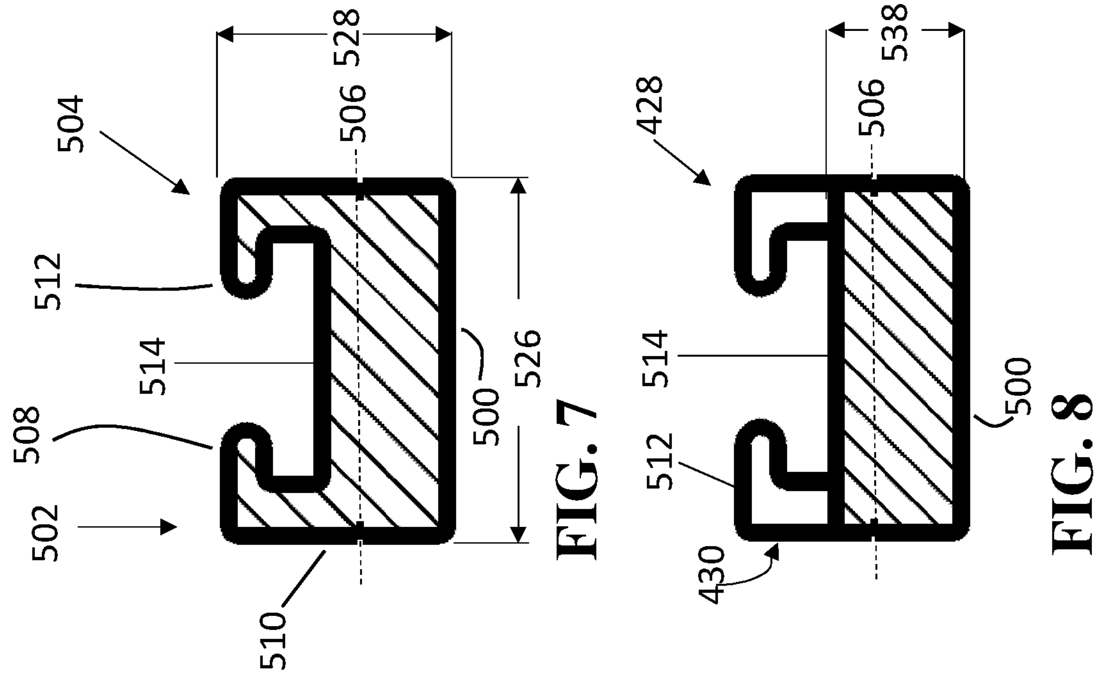
FIG. 7 is a cross-sectional view of a portion of the track slider of FIG. 6, taken along Section line 7-7 of FIG. 6.
FIG. 8 is a cross-sectional view of a portion of the track slider of FIG. 6, taken along Section line 8-8 of FIG. 6.

Referring now to FIGS. 6-8, track slider 404 will be described in further detail. Slider 404 includes a slide surface 500 having a slider width 526, height 528 and retention members 502, 504 which extend along a longitudinal centerline L of slider 404 and are for operably coupling slider to rail 402. Retention members 502, 504 extend vertically from slide surface 500, retention member 502 has an outermost part 510 and inner most part 508. In combination, slide surface 500 and retention members 502, 504 define a slide XX therebetween, which is configured to receive a portion of slide rail 402. In this way, track slider 404 is configured to engage or at least be positioned intermediate slide rail 402 and track 16. In one embodiment retention members 502, 504 are substantially inverted T-shapes as shown in FIG. 7, however, any suitably shaped slot may be used. Additionally, an upwardly extending protrusion such as a T-shaped protrusion may be used instead of or in combination with a slot to provide an attachment surface. Retention member 502 is located laterally across the longitudinal centerline L of slider 404 from the retention member 504, such that retention member 502 is positioned on a first lateral side of longitudinal centerline line L and retention member 504 is positioned on the opposing second lateral side of longitudinal centerline L. In this way, retention member 502 is configured to at least partially engage a first side of slide rail 402 and retention member 504 is configured to at least partially engage the opposing second side of slide rail 402.

Slider 404 includes a plurality of recessed or notched portions 428, 430 which reduce the material in locations where retention is not needed. In this embodiments of at least FIGS. 6-8, recesses 428, 430 remove substantially the entire retention surface of a longitudinal section of retention members 502, 504. As shown in FIGS. 6 and 8, recesses 428, 430 extend vertically downward from an upper most surface 512 of track slider 404 down to a lower most portion 514 of retention members 502, 504, thus the recessed height 538 of the slider 404 in a recessed portion 428, 430 is substantially lower than other areas of the slider 404 which include retention members 502, 504 extending between uppermost and lowermost surfaces 512, 514. Additionally, recessed portions 428, 430 may extend to a higher point or lower to any portion above the usable slide surface 500 as indicated by the wear line 506, such that recessed portions 428, 430 may extend to a position lower than lowermost surface 514 of retention members 502, 504 but above or at wear line 506. Recessed portions 428, 430 have a substantially trapezoidal shape when viewed from the side and extend the entire width 526 of slider 404, however, any suitably shaped recess may be used. These recessed portions 428, 430 help to reduce the weight of snowmobile 10. Illustratively the length of the individual recessed portions 428, 430 is at least one fourth the slide surface width 526. In one embodiment, the length of the individual recessed portions 428, 430 is substantially equal to the slide surface width 526. In other illustrative embodiments, the length of the individual recessed portions 428, 430 is greater than the slide surface width 526. By increasing the length of the recessed portions it reduces more material of the slider 404 and further reduces the weight of snowmobile 10.

As shown in FIG. 6, slider 404 has a length 516 that extends from a front end 518 to a rear end 520 with middle portion 540. Each retention member 502, 504 has a cumulative length dimension 524, 522 respectively which is the sum of the lengths of all the individual respective retention members 502, 504 on each side of slider 404. In this way, when slider 404 includes recessed portions 428, 430, cumulative length dimension 524 is less than overall length 516; however, if slider 404 does not include any recessed portions 428, 430, then cumulative length dimension 524 is substantially equal to overall length 516. Illustratively, cumulative length 524 is about fifty percent (50%) of the overall slider length dimension 516. In this way, this overall size, dimension, and configuration of slider 404 balances maintaining engagement to rail 402 with the light weighting feature provided by the recessed portion 428, 430. Because retention member 504 may be defined by a plurality of retention members, as shown in FIG. 6, the cumulative length 524 of retention member 504 may be illustrated by the sum of each individual length dimensions 504*a*, 504*b*, 504*c* . . . 504*n*, for example. In one embodiment, cumulative length 524 may be about five percent (5%) to about ninety-five percent (95%) of the overall length dimension 516 of the slider 404. In other illustrative embodiments, the length dimension 504 is twenty-five percent (25%), forty-five percent (45%), sixty-five percent (65%) or seventy-five percent (75%) of the slider length dimension 404, for example.

Still referring to FIG. 6, retention member 504 may be substantially equal in length to recessed portion 428 and slider 404 may be configured with alternating repeating sections of retention members 504 and recessed portions 428 (illustratively, retention members 504*a*, 504*b*, 504*c* . . . 504*n* longitudinally alternate with recessed portions 428*a*, 428*b*, 428*c* . . . 428*n*) along the longitudinal length 516 of slider 404. In another embodiment, the longitudinal length of retention member 504 does not equal the length of recessed portion 428, and the longitudinal length of recessed portion 504 is shorter than that of recessed portion 428. In yet another embodiment, the longitudinal length of retention member 504 does not equal that of recessed portion 428, and the longitudinal length of retention member 504 is longer than that of recessed portion 428.

In the illustrative embodiment of FIGS. 4 and 6-8, second retention member 502 may be substantially equal in length to recessed portion 430 and slider 404 may be configured with alternating repeating sections of retention members 502 and recessed portions 430 (illustratively, retention members 502*a*, 502*b*, 502*c* . . . 502*n* longitudinally alternate with recessed portions 430*a*, 430*b*, 430*c* . . . 430*n*) along the longitudinal length 516 of slider 404. In another embodiment, the longitudinal length of retention member 502 does not equal the length of recessed portion 430, and the longitudinal length of recessed portion 502 is shorter than that of recessed portion 430. In yet another embodiment, the longitudinal length of retention member 502 does not equal that of recessed portion 430, and the longitudinal length of retention member 502 is longer than that of recessed portion 430. In yet another embodiment second retention member 502 may not have any recessed portions 430 as in FIGS. 9-11 which will be described in further detail.

Figure 9:
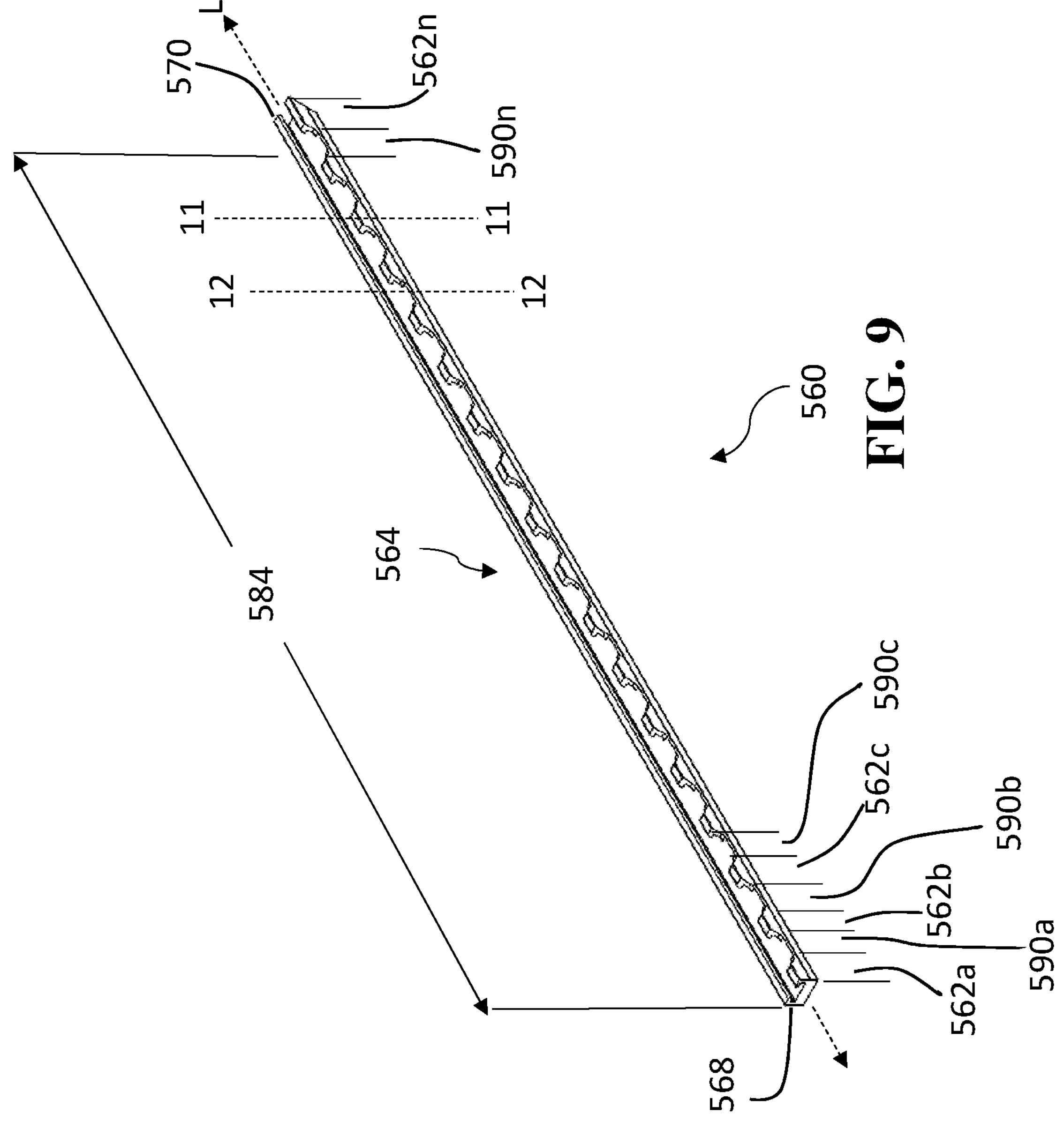
FIG. 9 is a perspective view of another embodiment of a track slider.
Figures 10, 11:
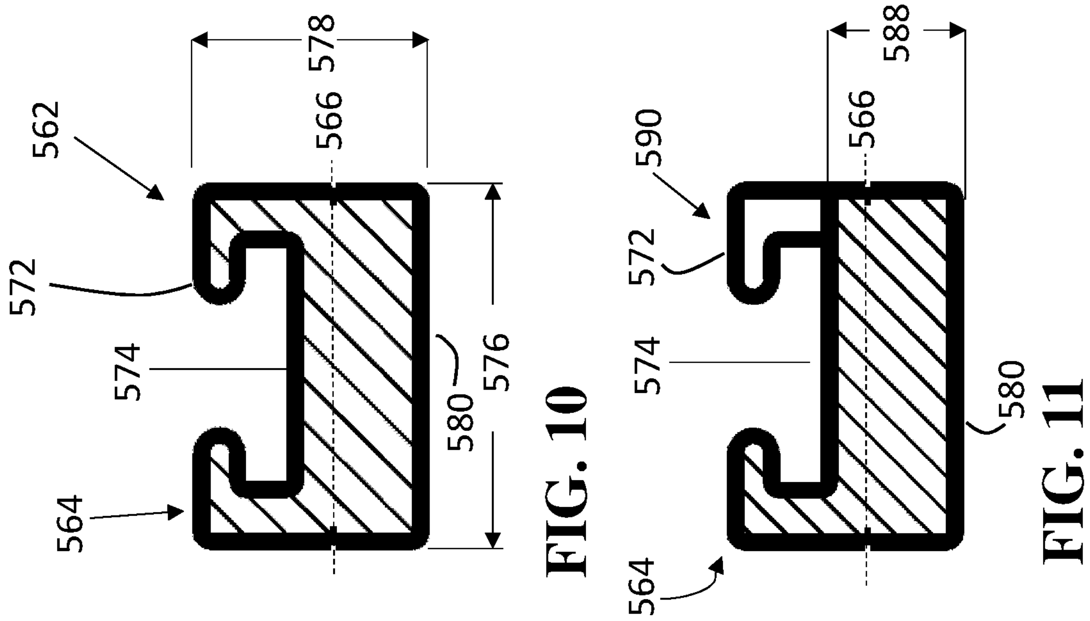
FIG. 10 is a cross-sectional view of a portion of the track slider of FIG. 9, taken along Section line 10-10 of FIG. 9.
FIG. 11 is a cross-sectional view of a portion of the track slider of FIG. 9, taken along Section line 11-11 of FIG. 9.

Another embodiment of a slider that may be used on snowmobile 10 is shown in FIGS. 9-11. Slider 560 of FIG. 9 includes a front end 568, a middle portion 582 and a rear end 570. Retention member 562 is located laterally across the longitudinal centerline L of slider 560 from the retention member 564, such that retention member 562 is positioned on a first lateral side of longitudinal centerline line L and retention member 564 is positioned on the opposing second lateral side of longitudinal centerline L. Retention member 562 includes a laterally recessed or notched portion 590, on middle portion 582 of slider 560. In this embodiment, recessed portion 590 are only on one side of longitudinal centerline L, as shown in the embodiment of slider 404 (FIGS. 6-8) where recessed portions 428 and 430 are on both sides of longitudinal centerline L. These recessed portions 590 help to reduce the weight of the entire snowmobile 10.

As shown in FIG. 9, slider 560 has a length 584 that extends from a front end 568 to a rear end 570. Retention member 562 has a cumulative length dimension 592 which is the sum of the lengths of all the individual respective retention members 562 on slider 560. In this way, when slider 560 includes recessed portions 590, cumulative length dimension 592 is less than overall length 584; however, if slider 560 does not include any recessed portions 590, then cumulative length dimension 592 is substantially equal to overall length 584. Illustratively, cumulative length 592 is about fifty percent (50%) of the overall slider length dimension 584. In this way, this overall size, dimension, and configuration of slider 560 balances maintaining engagement to rail 402 with the light weighting feature provided by the recessed portion 590. Because retention member 562 may be defined by a plurality of retention members, as shown in FIG. 9, the cumulative length 584 of retention member 590 may be illustrated by the sum of each individual length dimensions 590*a*, 590*b*, 590*c* . . . 590*n*, for example. In one embodiment, cumulative length 592 may be about five percent (5%) to about ninety-five percent (95%) of the overall length dimension 584 of the slider 560. In other illustrative embodiments, the length dimension 592 is twenty-five percent (25%), forty-five percent (45%), sixty-five percent (65%) or seventy-five percent (75%) of the slider length dimension 584, for example.

Still referring to FIG. 9, retention member 562 may be substantially equal in length to recessed portion 590 and slider 560 may be configured with alternating repeating sections of retention members 562 and recessed portions 590 (illustratively, retention members 562*a*, 562*b*, 562*c* . . . 562*n* longitudinally alternate with recessed portions 590*a*, 590*b*, 590*c* . . . 590*n*) along the longitudinal length 584 of slider 560. In another embodiment, the longitudinal length of retention member 562 does not equal the length of recessed portion 590, and the longitudinal length of recessed portion 562 is shorter than that of recessed portion 590. In yet another embodiment, the longitudinal length of retention member 562 does not equal that of recessed portion 590, and the longitudinal length of retention member 562 is longer than that of recessed portion 590.

Figure 12:
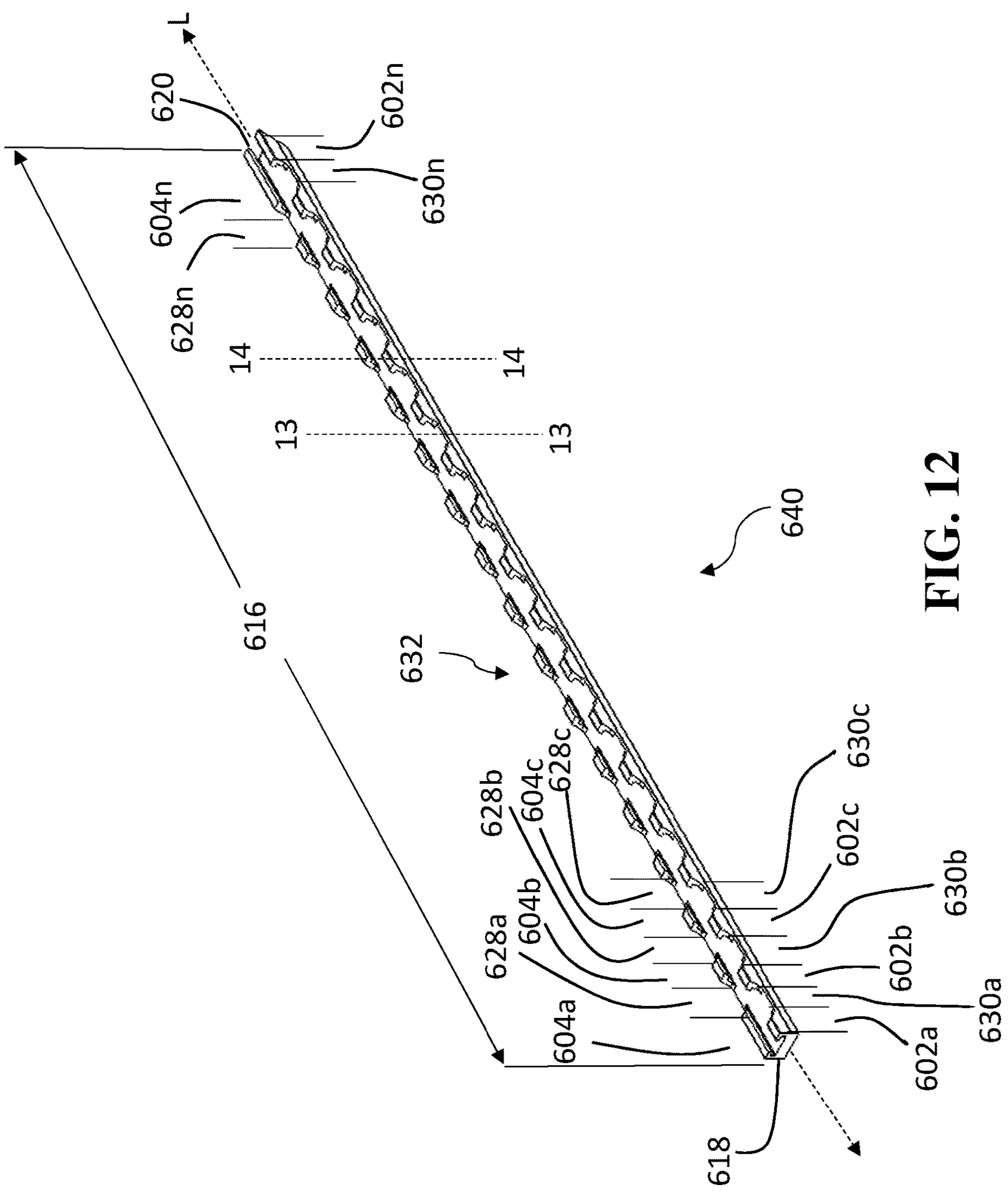
FIG. 12 is a perspective view of another embodiment of a track slider.
Figure 13:
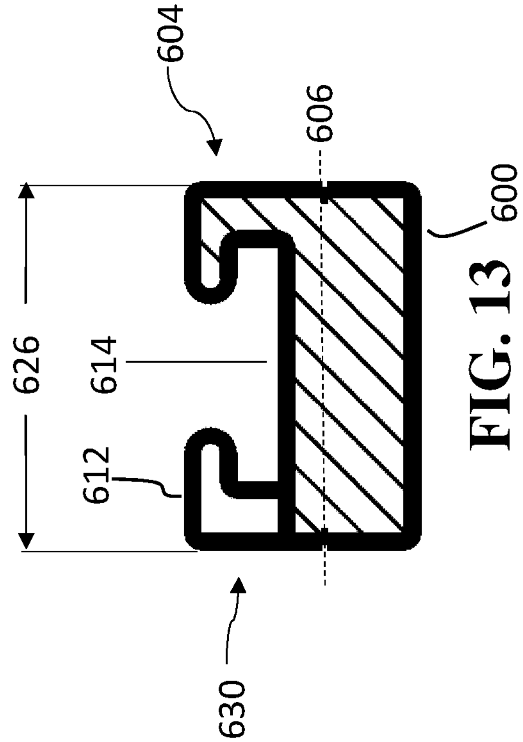
FIG. 13 is a cross-sectional view of a portion of the track slider of FIG. 12, taken along Section line 13-13 of FIG. 12.
Figure 14:
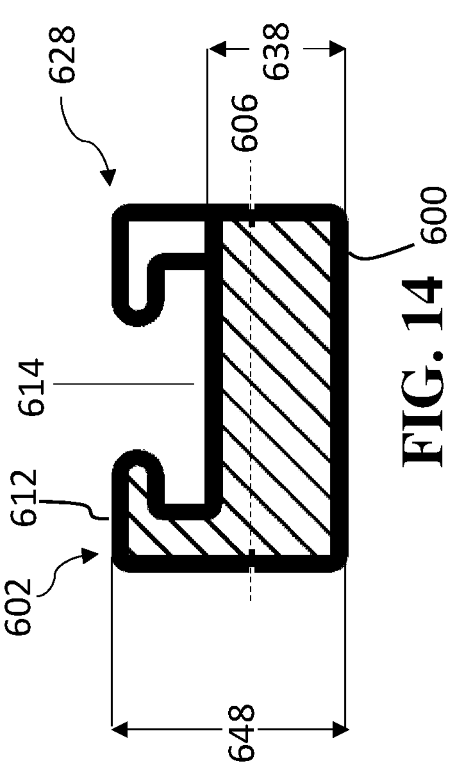
FIG. 14 is a cross-sectional view of a portion of the track slider of FIG. 12, taken along Section line 14-14 of FIG. 12.

Another embodiment of a slider that may be used on snowmobile 10 is shown in FIGS. 12-14. Slider 640 of FIG. 12 includes a front end 618, a middle portion 632 and a rear end 620. Retention members 602 and 604 of slider 640 each include a laterally recessed or notched portion 630 and 628, respectively, on middle portion 632 of slider 640. In this embodiment, recessed portion 630 and 628 are not substantially laterally aligned along longitudinal centerline L, as shown in the embodiment of slider 404 (FIGS. 6-8) where recessed portions 428 and 430 are laterally aligned and positioned at the same longitudinal position as each other. In this embodiment, at least one of the plurality of retention members 602 is substantially centered on recessed portion 628 such that retention members 602 and recessed portions 628 are laterally aligned. These recessed portions 628, 630 help to reduce the weight of the entire snowmobile 10 and may be manufactured using methods such as injection molding where tool slides would be allowed to slide laterally outwardly.

As shown in FIG. 12, slider 640 has a length 616 that extends from a front end 618 to a rear end 620. Each retention member 602, 604 has a cumulative length dimension 624, 622 respectively which is the sum of the lengths of all the individual respective retention members 602, 604 on each side of slider 640. In this way, when slider 640 includes recessed portions 628, 630, cumulative length dimension 624, 622 is less than overall length 616; however, if slider 640 does not include any recessed portions 628, 630, then cumulative length dimension 624, 622 is substantially equal to overall length 616. Illustratively, cumulative length 624, 622 is about fifty percent (50%) of the overall slider length dimension 616. In this way, this overall size, dimension, and configuration of slider 640 balances maintaining engagement to rail 402 with the light weighting feature provided by the recessed portion 628, 630. Because retention member 604 may be defined by a plurality of retention members, as shown in FIG. 12, the cumulative length 624 of retention member 604 may be illustrated by the sum of each individual length dimensions 604*a*, 604*b*, 604*c* . . . 604*n*, for example. In one embodiment, cumulative length 624 may be about five percent (5%) to about ninety-five percent (95%) of the overall length dimension 616 of the slider 640. In other illustrative embodiments, the length dimension 604 is twenty-five percent (25%), forty-five percent (45%), sixty-five percent (65%) or seventy-five percent (75%) of the slider length dimension 640, for example.

Still referring to FIG. 12, retention member 604 may be substantially equal in length to recessed portion 628 and slider 640 may be configured with alternating repeating sections of retention members 604 and recessed portions 628 (illustratively, retention members 604*a*, 604*b*, 604*c* . . . 604*n* longitudinally alternate with recessed portions 628*a*, 628*b*, 628*c* . . . 628*n*) along the longitudinal length 616 of slider 640. In another embodiment, the longitudinal length of retention member 604 does not equal the length of recessed portion 628, and the longitudinal length of recessed portion 604 is shorter than that of recessed portion 628. In yet another embodiment, the longitudinal length of retention member 604 does not equal that of recessed portion 628, and the longitudinal length of retention member 604 is longer than that of recessed portion 628.

In the illustrative embodiment of FIGS. 12-14, second retention member 602 may be substantially equal in length to recessed portion 630 and slider 640 may be configured with alternating repeating sections of retention members 602 and recessed portions 630 (illustratively, retention members 602*a*, 602*b*, 602*c* . . . 602*n* longitudinally alternate with recessed portions 630*a*, 630*b*, 630*c* . . . 630*n*) along the longitudinal length 616 of slider 640. In another embodiment, the longitudinal length of retention member 602 does not equal the length of recessed portion 630, and the longitudinal length of recessed portion 602 is shorter than that of recessed portion 630. In yet another embodiment, the longitudinal length of retention member 602 does not equal that of recessed portion 630, and the longitudinal length of retention member 602 is longer than that of recessed portion 630. In this embodiment retention member 602 and recessed portion 628 are substantially laterally aligned along longitudinal centerline L. In other illustrative embodiments, retention member 602 and recessed portion 628 are not substantially laterally aligned along longitudinal centerline L and only a portion of retention member 602 overlaps with recessed portion 628.

Figure 15:
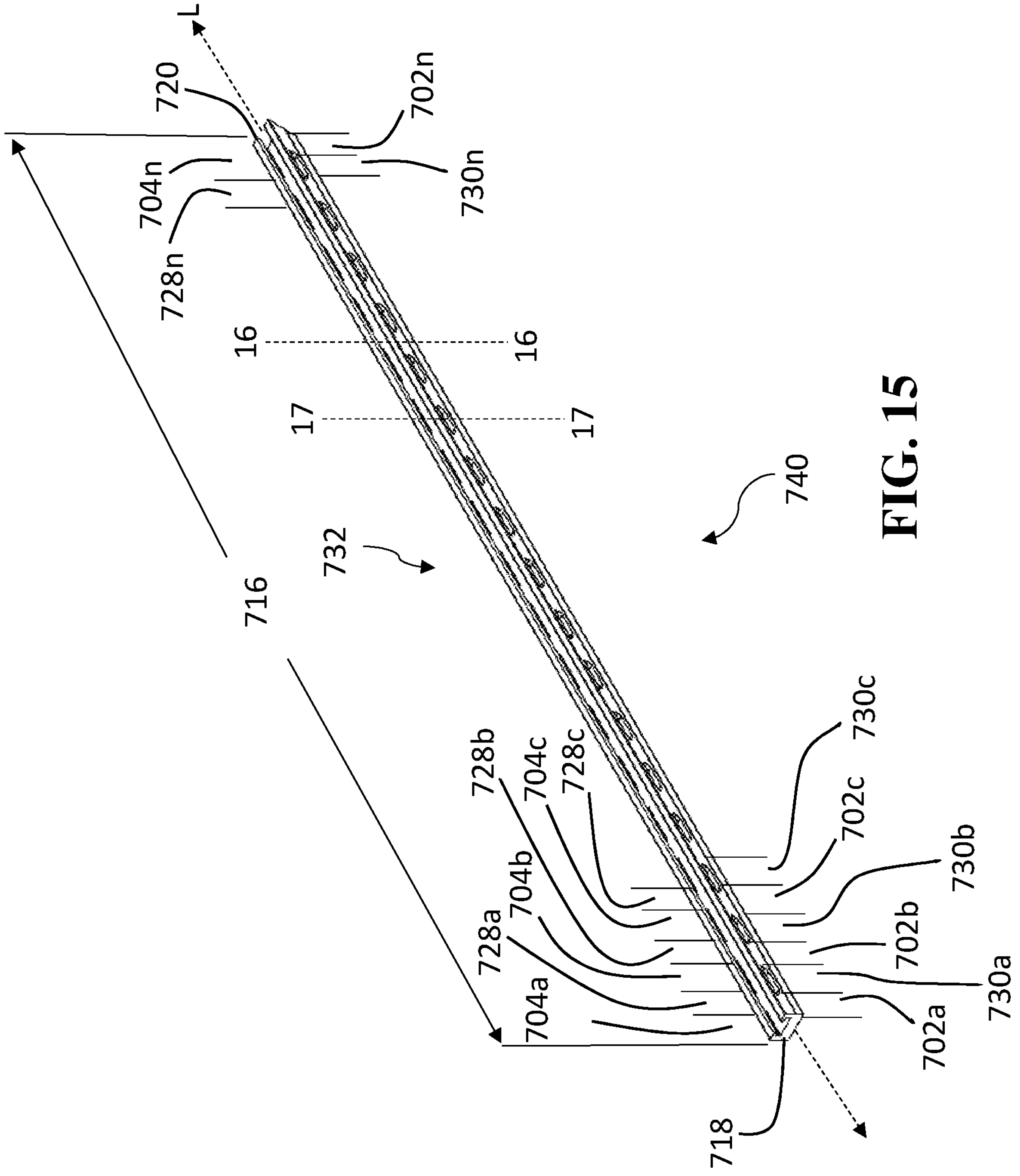
FIG. 15 is a perspective view of another embodiment of a track slider.
Figures 16, 17:
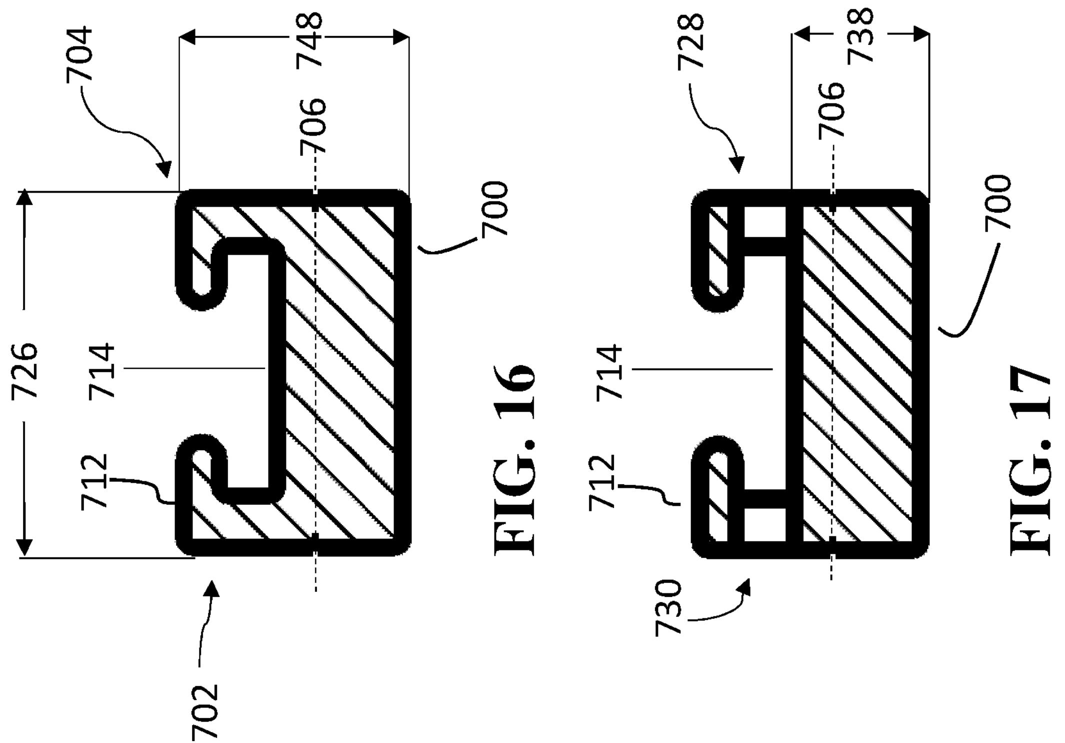
FIG. 16 is a cross-sectional view of a portion of the track slider of FIG. 15, taken along Section line 16-16 of FIG. 15.
FIG. 17 is a cross-sectional view of a portion of the track slider of FIG. 15, taken along Section line 17-17 of FIG. 15.

Another embodiment of a slider that may be used on snowmobile 10 is shown in FIGS. 15-17. Slider 740 of FIG. 15 includes a front end 718, a middle portion 732 and a rear end 720. Retention members 702 and 704 of slider 740 each include a laterally recessed or notched portion 730 and 728, respectively, on middle portion 732 of slider 740. In this embodiment, recessed portion 728, 730 creates an aperture in slider 740 leaving a portion of retention member 702, 704 extending above 728, 730, thus when viewed from the side a portion of rail 402 is viewable through slider 740. In this embodiment recessed portion 730 is substantially oval shaped and extends from an outer edge towards a longitudinal centerline of slider 740 and extend vertically downward from a position below the upper most surface 712 of track slider 740 down to a lower most portion 714 of retention members 702, 704. However, any suitably shaped recess may be used. Additionally, recessed portions may extend lower to any portion above the usable slide surface 700 as indicated by the wear line 706.

As shown in FIG. 15, slider 740 has a length 716 that extends from a front end 718 to a rear end 720. Each retention member 702, 704 has a cumulative length dimension 724, 722 respectively which is the sum of the lengths of all the individual respective retention members 702, 704 on each side of slider 740. In this way, when slider 740 includes recessed portions 728, 730, cumulative length dimension 724, 722 is less than overall length 716; however, if slider 740 does not include any recessed portions 728, 730, then cumulative length dimension 724, 722 is substantially equal to overall length 716. Illustratively, cumulative length 724, 722 is about fifty percent (50%) of the overall slider length dimension 716. In this way, this overall size, dimension, and configuration of slider 740 balances maintaining engagement to rail 402 with the light weighting feature provided by the recessed portion 728, 730. Because retention member 704 may be defined by a plurality of retention members, as shown in FIG. 12, the cumulative length 724 of retention member 704 may be illustrated by the sum of each individual length dimensions 704*a*, 704*b*, 704*c* . . . 704*n*, for example. In one embodiment, cumulative length 724 may be about five percent (5%) to about ninety-five percent (95%) of the overall length dimension 716 of the slider 740. In other illustrative embodiments, the length dimension 704 is twenty-five percent (25%), forty-five percent (45%), sixty-five percent (65%) or seventy-five percent (75%) of the slider length dimension 740, for example.

Still referring to FIG. 15, retention member 704 may be substantially equal in length to recessed portion 728 and slider 740 may be configured with alternating repeating sections of retention members 704 and recessed portions 728 (illustratively, retention members 704*a*, 704*b*, 704*c* . . . 704*n* longitudinally alternate with recessed portions 728*a*, 728*b*, 728*c* . . . 728*n*) along the longitudinal length 717 of slider 740. In another embodiment, the longitudinal length of retention member 704 does not equal the length of recessed portion 728, and the longitudinal length of recessed portion 704 is shorter than that of recessed portion 728. In yet another embodiment, the longitudinal length of retention member 704 does not equal that of recessed portion 728, and the longitudinal length of retention member 704 is longer than that of recessed portion 728.

In the illustrative embodiment of FIG. 15, second retention member 702 may be substantially equal in length to recessed portion 730 and slider 740 may be configured with alternating repeating sections of retention members 702 and recessed portions 730 (illustratively, retention members 702*a*, 702*b*, 702*c* . . . 702*n* longitudinally alternate with recessed portions 730*a*, 730*b*, 730*c* . . . 730*n*) along the longitudinal length 716 of slider 740. In another embodiment, the longitudinal length of retention member 702 does not equal the length of recessed portion 730, and the longitudinal length of recessed portion 702 is shorter than that of recessed portion 730. In yet another embodiment, the longitudinal length of retention member 702 does not equal that of recessed portion 730, and the longitudinal length of retention member 702 is longer than that of recessed portion 730. In this embodiment retention member 702 and recessed portion 728 are substantially laterally aligned along longitudinal centerline L. In other illustrative embodiments, retention member 702 and recessed portion 728 are not substantially laterally aligned along longitudinal centerline L and only a portion of retention member 702 overlaps with recessed portion 728.

Figure 18:
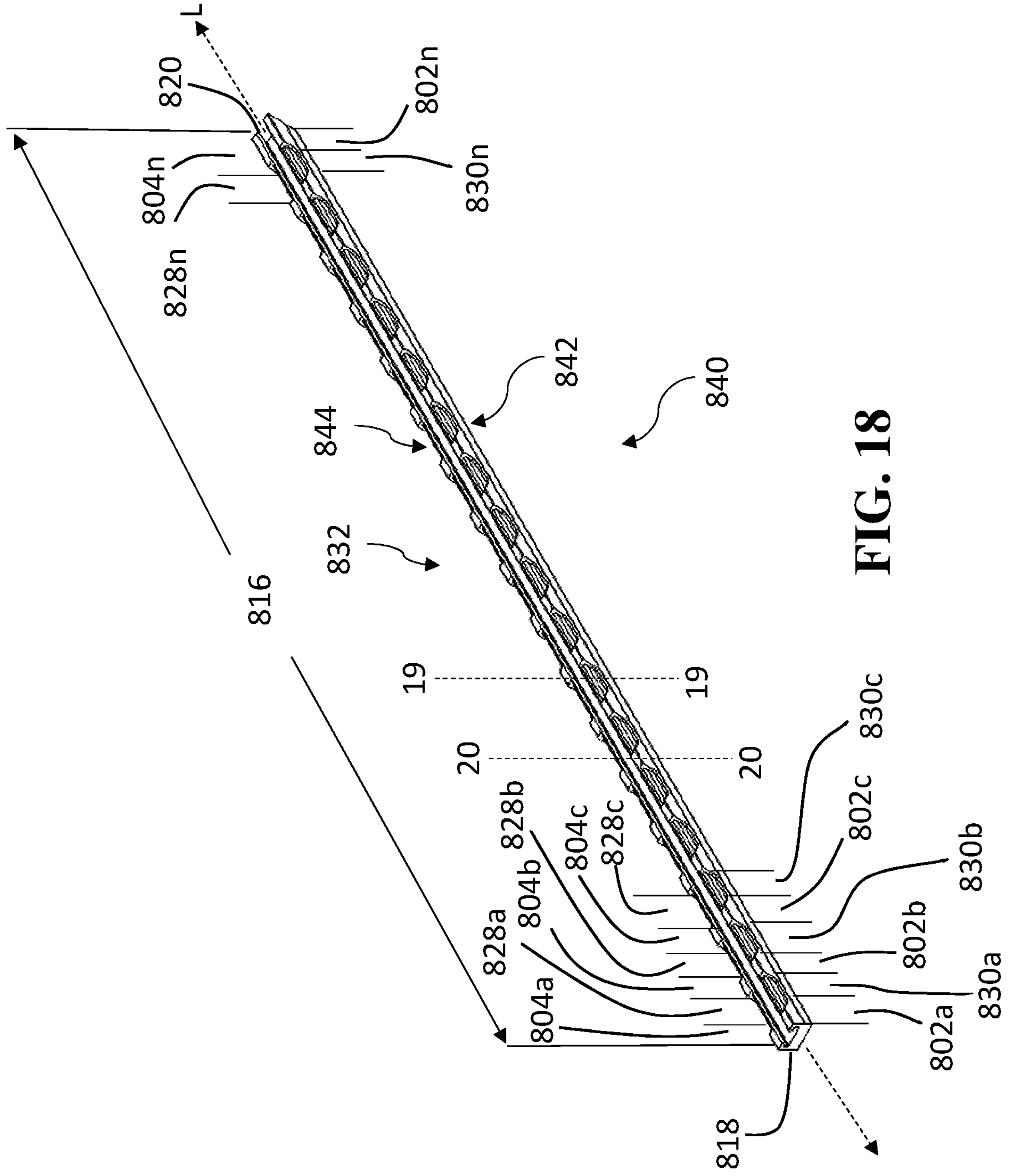
FIG. 18 is a perspective view of another embodiment of a track slider.
Figures 19, 20:
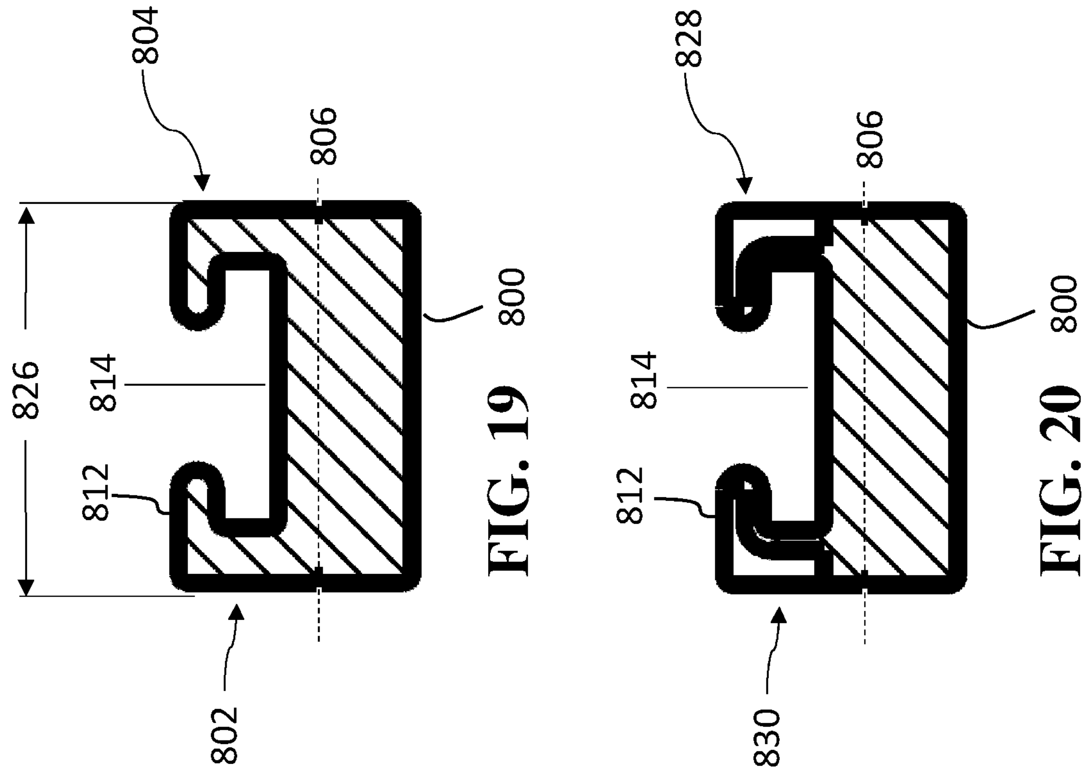
FIG. 19 is a cross-sectional view of a portion of the track slider of FIG. 18, taken along Section line 19-19 of FIG. 18.
FIG. 20 is a cross-sectional view of a portion of the track slider of FIG. 19, taken along Section line 20-20 of FIG. 18.

Another embodiment of a slider that may be used on snowmobile 10 is shown in FIGS. 18-20. Slider 840 of FIG. 18 includes a front end 818, a middle portion 832 and a rear end 820. Retention members 802 and 804 of slider 840 each include a laterally recessed or notched portion 830 and 828, respectively, on middle portion 832 of slider 840. In this embodiment, recessed portion 828, 830 only removes a portion of retention member 802, 804, leaving a portion of retention member 842, 844 intact continuously down the length of slider 840. In this embodiment recessed portion 828, 830 extends from an outer edge towards a longitudinal centerline L of slider 840 and extends vertically downward from a position at or below the upper most surface of track slider 812 down to a lower most portion 814 of retention members 802, 804. Additionally, recessed portions 828, 830 may extend lower to any portion above the usable slide surface 800 as indicated by the wear line 806.

As shown in FIG. 18, slider 840 has a length 816 that extends from a front end 818 to a rear end 820. Each retention member 802, 804 has a cumulative length dimension 824, 822 respectively which is the sum of the lengths of all the non recessed individual respective retention members on each side of slider 840. In this way, when slider 840 includes recessed portions 828, 830, cumulative length dimension 824, 822 is less than overall length 816; however, if slider 840 does not include any recessed portions 828, 830, then cumulative length dimension 824, 822 is substantially equal to overall length 816. Illustratively, cumulative length 824, 822 is about fifty percent (50%) of the overall slider length dimension 816. In this way, this overall size, dimension, and configuration of slider 840 balances maintaining slider strength with the light weighting feature provided by the recessed portion 828, 830. Because retention member 804 may be defined by a plurality of retention members, as shown in FIG. 18, the cumulative length 824 of retention member 804 may be illustrated by the sum of each individual length dimensions 804*a*, 804*b*, 804*c* . . . 804*n*, for example. In one embodiment, cumulative length 824 may be about five percent (5%) to about ninety-five percent (95%) of the overall length dimension 816 of the slider 840. In other illustrative embodiments, the length dimension 804 is twenty-five percent (25%), forty-five percent (45%), sixty-five percent (65%) or seventy-five percent (75%) of the slider length dimension 840, for example.

Still referring to FIG. 18, retention member 804 may be substantially equal in length to recessed portion 828 and slider 840 may be configured with alternating repeating sections of retention members 804 and recessed portions 828 (illustratively, retention members 804*a*, 804*b*, 804*c* . . . 804*n* longitudinally alternate with recessed portions 828*a*, 828*b*, 828*c* . . . 828*n*) along the longitudinal length 818 of slider 840. In another embodiment, the longitudinal length of retention member 804 does not equal the length of recessed portion 828, and the longitudinal length of recessed portion 804 is shorter than that of recessed portion 828. In yet another embodiment, the longitudinal length of retention member 804 does not equal that of recessed portion 828, and the longitudinal length of retention member 804 is longer than that of recessed portion 828.

In the illustrative embodiment of FIGS. 18, second retention member 802 may be substantially equal in length to recessed portion 830 and slider 840 may be configured with alternating repeating sections of retention members 802 and recessed portions 830 (illustratively, retention members 802*a*, 802*b*, 802*c* . . . 802*n* longitudinally alternate with recessed portions 830*a*, 830*b*, 830*c* . . . 830*n*) along the longitudinal length 816 of slider 840. In another embodiment, the longitudinal length of retention member 802 does not equal the length of recessed portion 830, and the longitudinal length of recessed portion 802 is shorter than that of recessed portion 830. In yet another embodiment, the longitudinal length of retention member 802 does not equal that of recessed portion 830, and the longitudinal length of retention member 802 is longer than that of recessed portion 830. In this embodiment retention member 802 and recessed portion 828 are substantially laterally aligned along longitudinal centerline L. In other illustrative embodiments, retention member 802 and recessed portion 828 are not substantially laterally aligned along longitudinal centerline L and none of or only a portion of retention member 802 overlaps with recessed portion 828.

Figure 21:
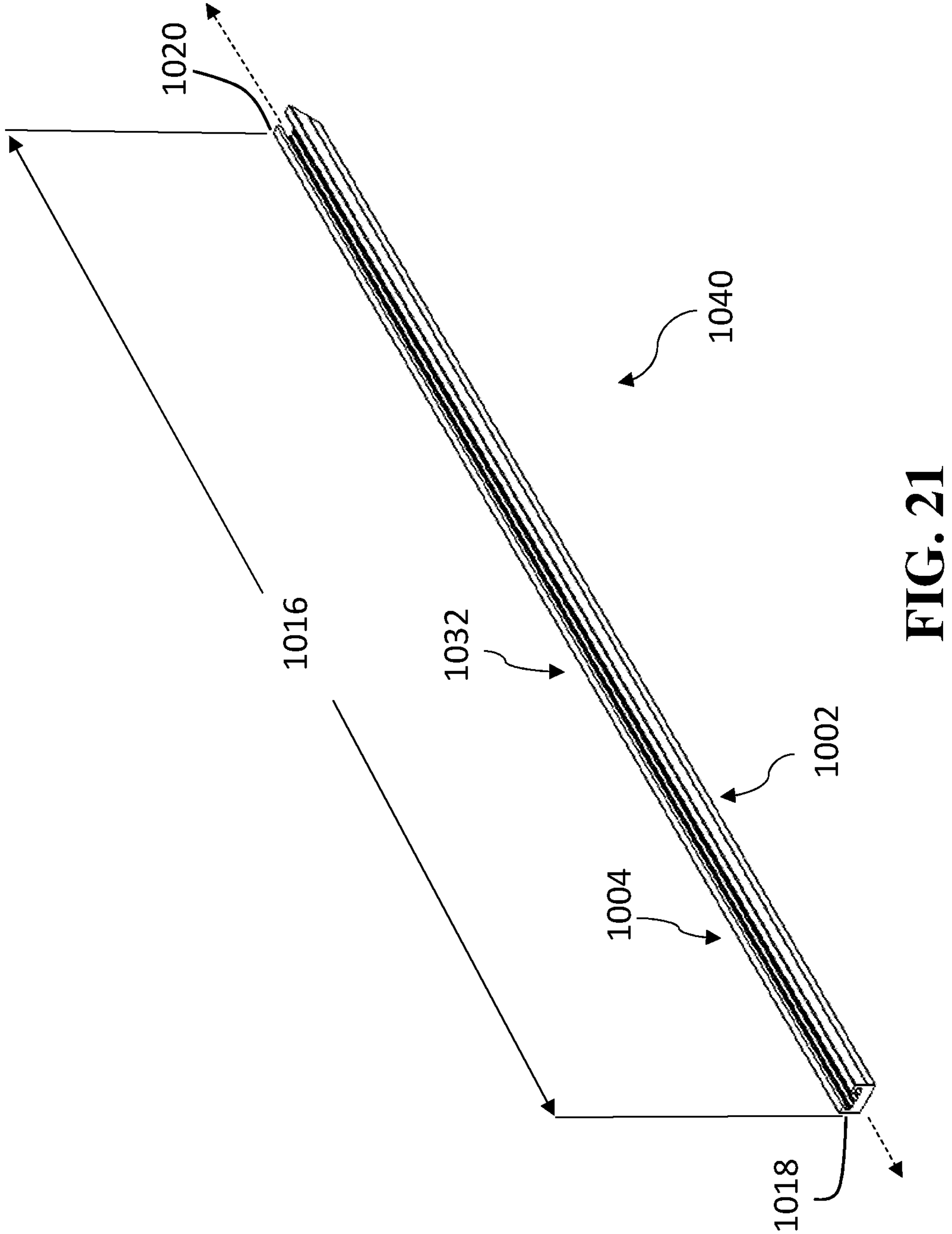
FIG. 21 is a perspective view of another embodiment of a track slider.
Figure 22:
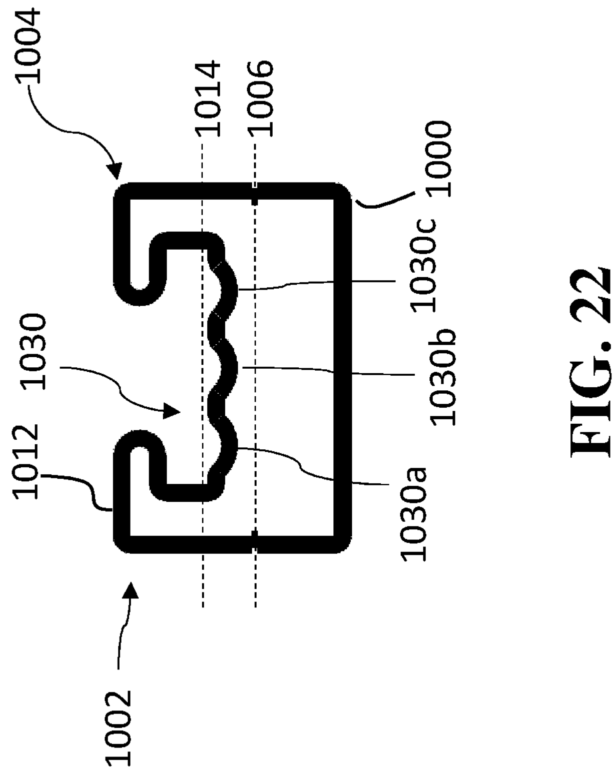
FIG. 22 is a rear view of the track slider of FIG. 21.

Another embodiment of a slider that may be used on snowmobile 10 is shown in FIGS. 21-22. Track slider 1040 will be described in further detail. Slider 1040 includes a slide surface 1000, retention members 1002, 1004 extend a longitudinal centerline L of slider 1040 and are for operably coupling slider to rail 402. Retention members 1002, 1004 extend vertically from slide surface 500 and inwardly towards centerline L at as they extend upward slide surface 1000. Retention member 1002 is located laterally across the longitudinal centerline L of slider 1004 from the retention member 1004, such that retention member 1002 is positioned on a first lateral side of longitudinal centerline line L and retention member 1004 is positioned on the opposing second lateral side of longitudinal centerline L.

Slider 1040 includes a plurality of recessed or notched portions 1030 which reduce the material in locations where support of the rail 402 is not needed. These recessed 1030 portions help to reduce the weight of snowmobile 10. In this embodiment recesses 1030 remove of portion of a support surface 1014 which engages the base of rail 402. Recesses 1030 extend vertically downward from surface 1014 thus creating a gap or void between slider 1040 and rail 402 when installed. Additionally, recessed portions 1030 may extend lower to any position above the usable slide surface 1000 as indicated by the wear line 1006. Recessed portion 1030 is defined by multiple recessed portions 1030*a*, 1030*b*, 1030*c* which form a substantially sinusoidal shape viewed from the end and extend the entire length of slider 1040, however, any suitable number and shape of recesses may be used. As discussed above, the recessed portion 1030 extends the entire length of slider 1040. In other illustrative embodiments, the recessed portion 1030 extends along only portion of slider 1040 or has multiple repeating recessed portions down the length of slider 1040. Additional recessed portions 428, 430, 628, 630, 728, 730, 828, 830, or single sided retention member 1204 may be used with this invention.

Figure 23:
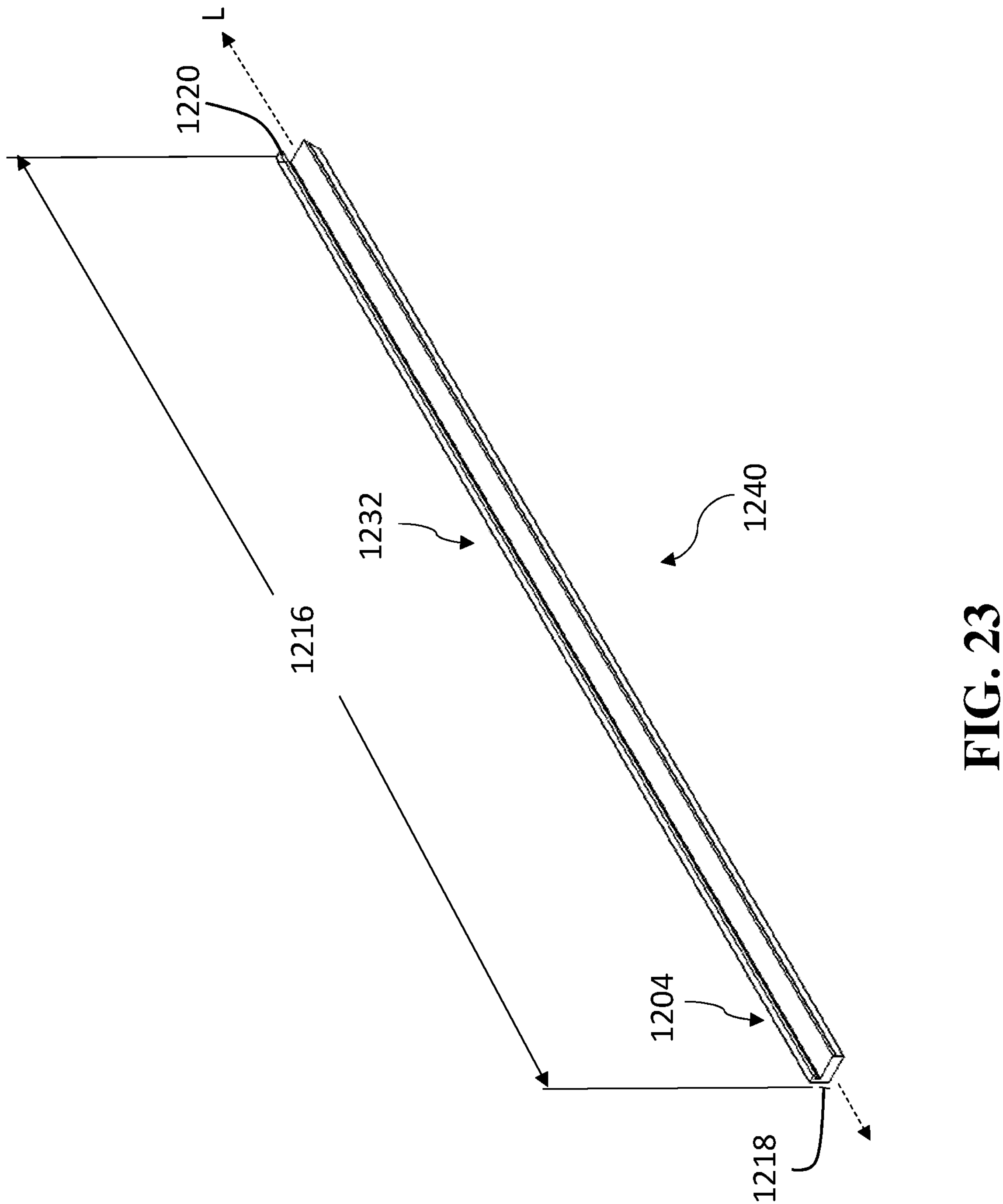
FIG. 23 is a perspective view of another embodiment of a track slider.
Figure 24:
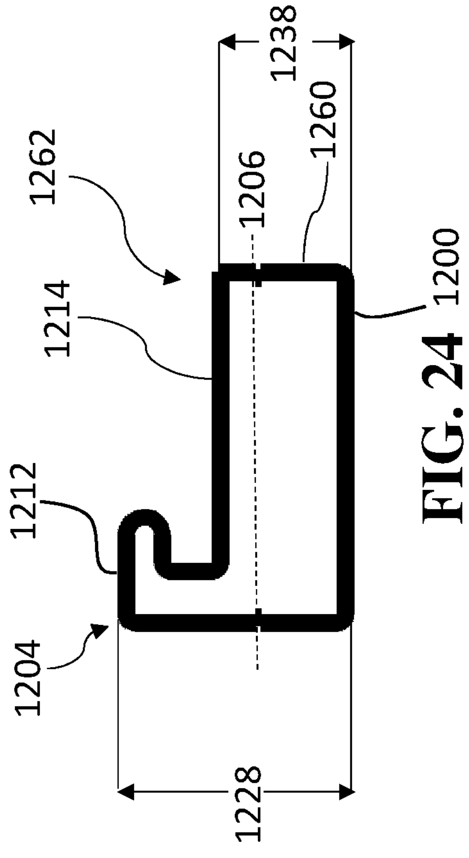
FIG. 24 is a rear view of the track slider of FIG. 23.

Another embodiment of a slider that may be used on snowmobile 10 is shown in FIGS. 23 and 24. Slider 1240 of FIG. 23 includes front end 1218, middle portion 1232 and rear end 1220. A retention member 1204 of slider 1240 is located on a single side of a longitudinal center line on slider 1240. In this embodiment retention member 1204 extends the entire length of slider 1240 but in other embodiments any of the recessed portions 428, 430, 628, 630, 728, 730, 828, 830, or 1030 may be used with this invention. In this embodiment the bottom rail engagement surface 1214 extends from the longitudinal centerline of slider L to the outer edge 1260 as a continuous surface. In other embodiments the region 1262 may have a lower surface than 1214 and may extend as low as wear line 1206.

Figure 25:
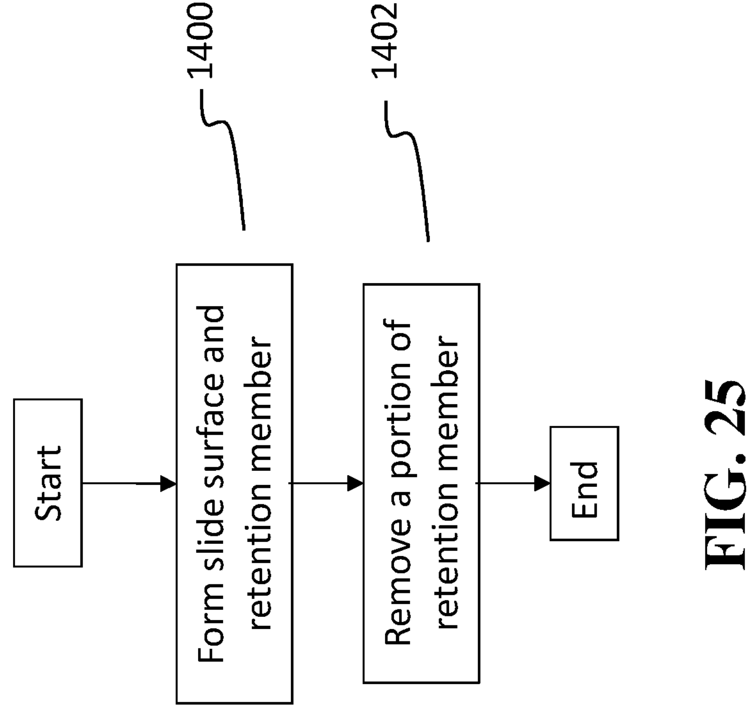
FIG. 25 is a flow chart for an illustrative method of manufacturing a track slider.

As shown in FIG. 25 various embodiments of the invention also include a method of manufacturing a slider 404. In some embodiments, the method includes a first step 1400 of forming a slide surface 500 and at least a single retention member 502, 504 and a second step 1402 of removing a portion of a retention member 428, 430 and maintaining slide surface 500. Step 1400 may include forming the slide surface and retention member in a molding process, such as injection molding or compression molding, machining slide surface and retention member from raw material or bar stock, extruding the slide surface and retention member or any other type of forming process configured to produce the configuration of the slide surface and retention member. Step 1402 may include removing an overlapping first portion and a second portion of the retention member. Step 1402 further includes forming a recess that extends down a portion of the length of slider 404, a height that extends vertically on slider 404, a width that extends laterally on slider 404, and the length of the recess is greater than the height and width of slider 404. Step 1402 may include removing a portion of retention member by machining, extruding, shearing, cutting, drilling or any other type of process configured to remove material. In one embodiment step 1402 forms the recess in the same step as 1400 when slide surface and retention members are formed.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An injection molded track slider for a snowmobile, comprising:

a slide surface extending along a longitudinal axis;

a first plurality of retention members extending from a first side of the slide surface;

a second plurality of retention members extending from a second side of the slide surface;

a first plurality of recesses formed by at least one tool slide and longitudinally alternating between the first plurality of retention members; and a second plurality of recesses formed by the at least one tool slide and longitudinally alternating between the second plurality of retention members.

2. The injection molded track slider of claim 1, wherein each retention member of the first plurality of retention members is substantially centered on and laterally aligned with a recess of the second plurality of recesses and each retention member of the second plurality of retention members is substantially centered on and laterally aligned with a recess of the first plurality of recesses.

3. The injection molder track slider of claim 1, wherein the first plurality of retention members does not overlap the second plurality of retention members when viewed from the side.

* * * * *